(12) United States Patent
Bhanot et al.

(10) Patent No.: US 7,899,625 B2
(45) Date of Patent: Mar. 1, 2011

(54) METHOD AND SYSTEM FOR ROBUST CLASSIFICATION STRATEGY FOR CANCER DETECTION FROM MASS SPECTROMETRY DATA

(75) Inventors: Gyan Vatsaraja Bhanot, Princeton, NJ (US); Gabriele Alexe, Yorktown Heights, NY (US); Arnold J. Levine, Carversville, PA (US); Babu Venkataraghavan, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 11/493,838

(22) Filed: Jul. 27, 2006

(65) Prior Publication Data

US 2008/0025591 A1    Jan. 31, 2008

(51) Int. Cl.
   G06F 7/00    (2006.01)
(52) U.S. Cl. ............... 702/19; 702/20; 703/11; 703/12; 703/13; 707/700
(58) Field of Classification Search ............ None
   See application file for complete search history.

(56) References Cited

U.S. PATENT DOCUMENTS

| | | | | |
|---|---|---|---|---|
| 6,898,533 | B1 * | 5/2005 | Miller et al. | 702/27 |
| 7,542,959 | B2 * | 6/2009 | Barnhill et al. | 706/48 |
| 2002/0145425 | A1 * | 10/2002 | Ebbels et al. | 324/309 |
| 2003/0229451 | A1 * | 12/2003 | Hamilton et al. | 702/19 |
| 2005/0209785 | A1 * | 9/2005 | Wells et al. | 702/19 |

OTHER PUBLICATIONS

Ornstein, DK, et al., "Serum proteomic profiling can discriminate prostate cancer from benign prostates in men with total prostate specific antigen levels between 2.5 and 15.0 ng/ml.", J. Urol. Oct. 2004;(4 Pt 1): 1302-5.
Posadas, EM, et al., "Proteomics and ovarian cancer: implications for diagnosis and treatment: a critical review of the recent literature.", Curr Opin Oncol. Sep. 2004;16(5): 478-84.
Shau, H, et al., "Proteomic profiling of cancer biomarkers", Briefings in Functional Genomics and Proteomics, vol. 2, No. 2, pp. 147-158, Jul. 2003.
Semmes, O. John, "Defining the Role of Mass Spectrometry in Cancer Diagnostics", Cancer Epidemiol Biomarkers Prev. vol. 13, No. 10, Oct. 2004.
Lev Bar-Or, Ruth, et al., "Generation of oscillations by the p53-Mdm2 feedback loop: A theoretical and experimental study", PNAS, vol. 97, No. 21, pp. 11250-11255, Oct. 10, 2000.
Weng, Zheng, et al., "Mass Spectrometric Analysis of Protein Markers for Ovarian Cancer", Clincal Chemistry, vol. 50, pp. 1939-1942, 2004.
Liotta, Lance A., et al., "High-resolution serum proteomic patterns for ovarian cancer detection", Endocrinology Journals, vol. 11, pp. 585-587, 2004.
Grizzle, William E., et al., "Serum protein expression profiling for cancer detection: Validation of a SELDI-based approach for prostate cancer", Disease Markers, vol. 19, pp. 185-195, (2003,2004)IOS Press.
Wagner, Michael, et al., "Computational protein biomarker prediction: a case study for prostate cancer", BMC Biomformatics, vol. 5, No. 26, pp. 1471-2105, 2004.
Schwartz, Sarah A., et al., "Protein Profiling in Brain Tumors Using Mass Spectrometry: Feasibility of a New Technique for the Analysis of Protein Expression", Clinical Cancer Research, vol. 10, pp. 981-987, Feb. 1, 2004.
Diamandis, Eleftherios P., "Point Proteomic Patterns in Biological Fluids: Do they represent the future of Cancer Diagnositcs?", Clinical Chemistry, vol. 49, No. 8, pp. 1272-1278 (2003).
Diamandis, Eleftherios P., "Mass Spectrometry as a Diagnostics and a Cancer Biomarker Discovery Tool: Opportunities and Potential Limitations", Molecular & Cellular Proteomics, MCP Papers in Press, Feb. 28, 2004.
Alfonso, P., et al., "Proteomic analysis of lung biopies: Differential protein expression profile between peritumoral and tumoral tissue.",Proteomics, vol. 4, No. 2, pp. 442-447, Feb. 2004.
Eschrich, S., et al., "DNA microarrays and data analysis: an overview.", Surgery, vol. 136, No. 3, pp. 500-503, Sep. 2004.
Huang, E., et al., "An overview of genomic data analysis*1.", Surgery, vol. 136, No. 3, pp. 497-499, 2003.
White, CN, et al., "Bioinformatics strategies for proteomic profiling.", Clinical Biochem., vol. 37, No. 7, pp. 636-641, Jul. 2004.
Petricoin, EF, et al., "Clincal proteomics: Applications for prostate cancer biomarker discovery and detection.", Urol. Oncol., vol. 22, No. 4, pp. 322-328, Jul.-Aug. 2004.
Laronga, C, et al., "SELDI-TOF serum profiling for prognostic and diagnostic classification of breast cancers.", Dis. Markers, vol. 19, Nos. 4 and 5, pp. 229-238, 2003-2004.
Yates, JR 3rd., "Mass spectral analysis in proteomics.", Annu. Rev. Biophys. Biomol. Struct., vol. 33, pp. 297-316, 2004.

* cited by examiner

*Primary Examiner* — Mary K Zeman
(74) *Attorney, Agent, or Firm* — McGinn IP Law Group, PLLC; Vazken Alexanian

(57) ABSTRACT

A robust classification method for cancer detection from mass spectrometry data includes inputting the mass spectrometry data, preprocessing the spectrometry data, conducting robust feature selection, generating predictions for the test data sets using multiple data classifiers, the multiple data classifiers including artificial neural networks, support vector machines, weighted voting on data patterns, classification and regression trees, k-nearest neighbor classification, and logistic regression, and constructing and validating a meta-classifier by combining individual predictions of the multiple data classifiers to generate a robust prediction of a phenotype. The test data sets are used exclusively for validation of the meta-classifier.

19 Claims, 5 Drawing Sheets

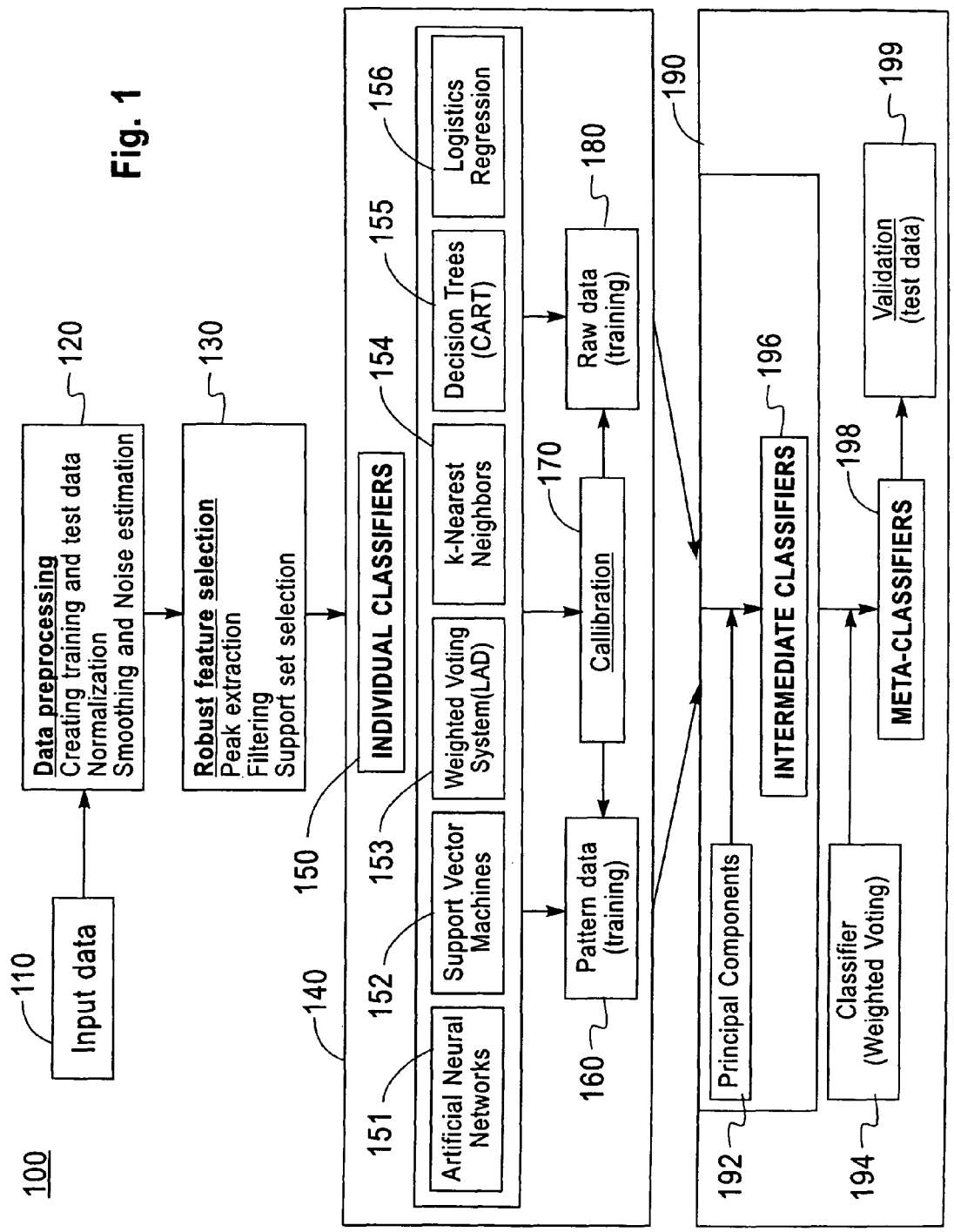

400

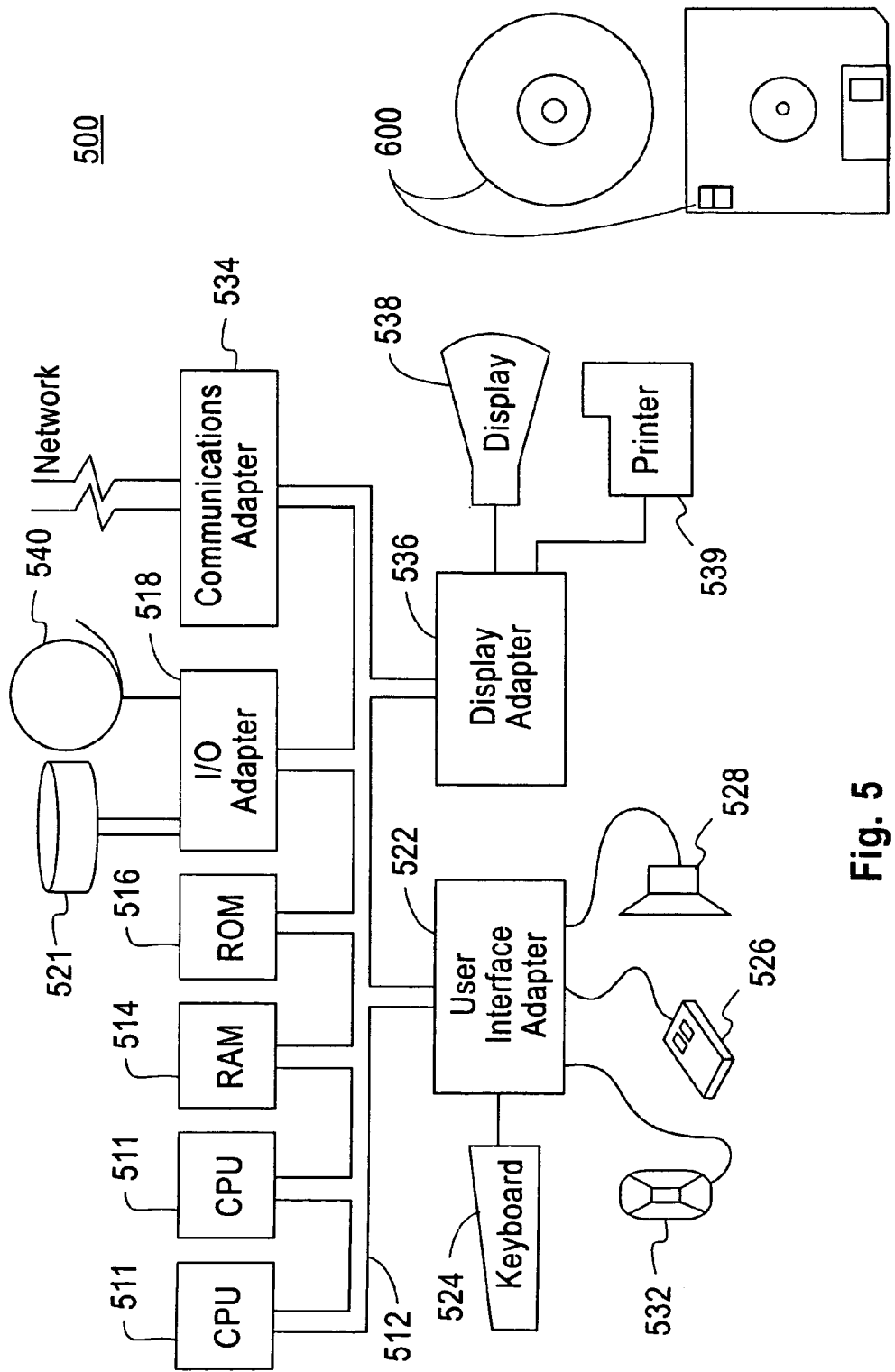

METHOD AND SYSTEM FOR ROBUST CLASSIFICATION STRATEGY FOR CANCER DETECTION FROM MASS SPECTROMETRY DATA

BACKGROUND OF THE INVENTION

1. Field of the Invention

The present invention relates to data classification strategies, and more particularly to a robust data classification strategy using machine learning tools on mass spectrometry data to create a robust phenotype identifier to detect cancer.

2. Description of the Related Art

The field of genomics and proteomics has grown rapidly. However, in spite of much effort there remains a need for robust, clinically useful predictors that might be adopted by the medical community.

Conventional techniques have been developed to use biological data for phenotype identification from data and, more particularly, phenotype prediction for various types of cancer. However, these conventional techniques have limitations, due to the current status of the instruments used to obtain the data, due to a lack of robustness of the selected biomarkers or of the predictive models, due to poor validation and due to a lack of protein biomarker and pathway identification. There exists a need for a robust, accurate and noise insensitive phenotype identifier to distinguish cancer from non-cancer.

Other difficulties with mass spectrometry data include the large data size (e.g., on the order of tens of thousands to hundreds of thousands of features), the need to distinguish subtle differences between phenotype properties, and the incoherence between predictions provided by different techniques. These issues make it necessary to devise a technique to integrate over different methods to get an ensemble view of the data.

SUMMARY OF THE INVENTION

In view of the foregoing and other exemplary problems, drawbacks, and disadvantages of the conventional methods and structures, an exemplary feature of the present invention is to provide a method (and system) for using machine learning tools on mass spectrometry data to create a robust, accurate and noise insensitive phenotype identifier to detect cancer.

In accordance with an exemplary aspect of the present invention, a robust classification method for cancer detection from mass spectrometry data includes inputting the mass spectrometry data, preprocessing the spectrometry data by creating a training data set and test data sets, normalizing the mass spectrometry data, smoothing the mass spectrometry data, after the normalizing, to reduce noise, and estimating experimental noise in the training data to be normally distributed, conducting robust feature selection including peak extraction to identify peaks in a data spectrum and to extract the peaks from background data in the data spectrum, filtering data peaks extracted by the peak extraction to retain data peaks best able to discriminate between cancer cases and non-cancer cases in the training data set, and selecting a support set of data on which an accurate weighting pattern-based model can be constructed by using a combinatorial pattern recognition algorithm to extract a large collection of data patterns from the training data and from perturbations with experimental noise of the training data set, generating predictions for the test data sets using multiple data classifiers, the multiple data classifiers including artificial neural networks, support vector machines, weighted voting on data patterns, classification and regression trees, k-nearest neighbor classification, and logistic regression, and constructing and validating a meta-classifier by combining individual predictions of the multiple data classifiers to generate a robust prediction of a phenotype. The test data sets are used exclusively for validation of the meta-classifier.

The present invention provides a robust, error optimum method to distinguish prostate cancer cases from non-cancer cases using only the location and the amplitude of peaks in mass spectrometry data. The method of the present invention identifies biomarkers that are robust against experimental noise, sample composition, and classification method used. The method uses patterns as synthetic variables, which add structural information to the data, reduce sensitivity to noise and identify combinatorial biomarkers. The meta-classifier of the present invention incorporates averaging to achieve optimal prediction by using orthogonal components.

In accordance with certain aspects of the present invention, a method for phenotype identification involves a stringent noise analysis and filtering procedure followed by combining the results of several machine learning tools trained on pattern data to produce a robust predictor. The method identifies robust biomarkers, which are robust against experimental noise, sample composition of the data, and classification/machine learning technique used. The method uses patterns as synthetic variables, which add structural information to the data, reduce sensitivity to noise and identify combinatorial biomarkers. Additionally, the method uses a meta-classification scheme that is trained on pattern data. The meta-classifier has robust error properties over any individual machine learning technique because it incorporates averaging to achieve optimal prediction by using orthogonal components.

The meta-classifier can be used for cross-platform studies because it is insensitive to noise produced by variations in data acquisition techniques, preprocessing, etc. This makes it possible to compare results from two separate labs or apply the analysis from one experiment to validate or make predictions on the data from a different experiment.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 1 illustrates a flow diagram for a robust classification method 100 for cancer detection from mass spectrometry data in accordance with an exemplary embodiment of the present invention;

FIG. 5 illustrates an exemplary hardware/information handling system 500 for incorporating the present invention therein; and FIG. 6 illustrates a signal bearing medium 600 (e.g., storage medium) for storing steps of a program of a method according to the present invention.

DETAILED DESCRIPTION OF EXEMPLARY EMBODIMENTS OF THE INVENTION

Figure 2A:
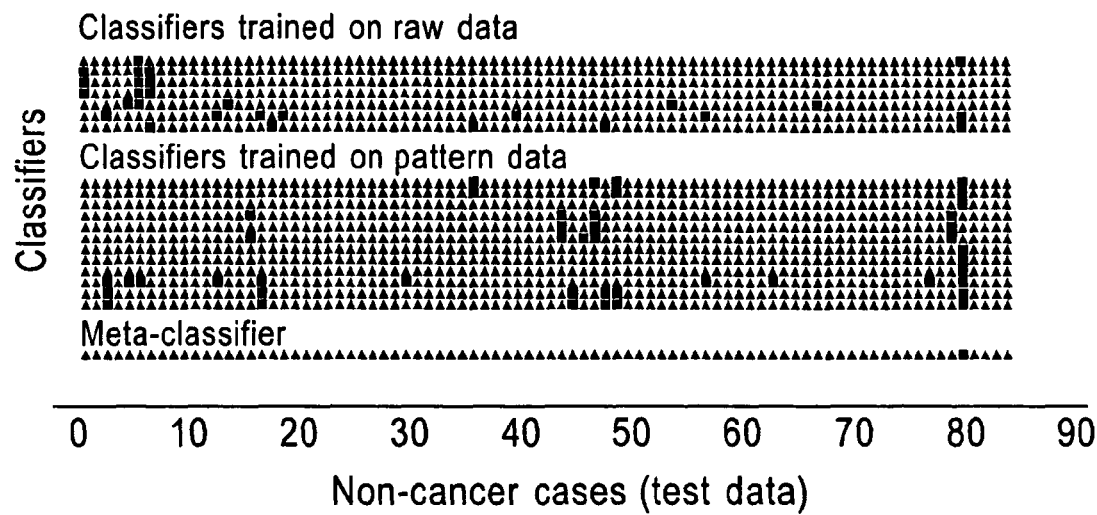
FIG. 2A illustrates predictions of the meta-classifier and of individual classifiers on non-cancer cases.

Referring now to the drawings, and more particularly to FIGS. 1-6, there are shown exemplary embodiments of the method and structures according to the present invention.

The following discussion of the present invention is described with respect to publicly available proteomic prostate cancer data. However, the context of proteomic prostate cancer data is merely provided for exemplary purposes and is not meant to limit the scope of the invention.

The data consist of 322 serum spectra composed of peak amplitude measurements at 15154 points defined by corresponding m/z values in the range 0-20000 Da. Each of these 15154 data points should not be interpreted as the record of a distinct peptide, as an ion peak may be spread across many data points. The smoothing procedure defined below (necessary to account for experimental reading error in locating the m/z value) further smears out the data.

Sera are provided by 63 patients with a normal prostate, 190 patients with benign prostate conditions, 26 patients with prostate cancer and PSA level in the range 4-10, and 43 patients with prostate cancer and PSA above 10. The sera are analyzed by C16 hydrophobic protein chips. Data is generated by using the SELDI-TOF mass spectrometry techniques and is provided with baseline subtracted.

The meta-learning method 100 of an exemplary embodiment of the present invention is illustrated in FIG. 1. Data (e.g., the prostate cancer data) is input (step 110) by the user. Then, the data is preprocessed (step 120). Data preprocessing includes creating training and test data sets, normalization, smoothing and noise estimation. Next, robust feature selection is conducted (step 130). Robust feature selection includes peak extraction, peak filtering and support set selection.

Next, that data is subjected to multiple classifier construction (step 140), which involves applying several machine learning methods to the raw and pattern training data to generate predictions for the test data. Specifically, the pattern data (160) and the raw data (180) are trained using a series of individual classifiers (150). The individual classifiers may include, but are not limited to, artificial neural networks (151), support vector machines (152), weighted voting systems (LAD) (153), k-nearest neighbors (154), decision trees (CART) (155) and logistic regression (156). The trained pattern data (160) and the trained raw data (180) are calibrated (step 170).

Next, the data is subjected to meta-classifier construction and validation (step 190). The predictions of the multiple classifiers are combined to generate a robust prediction of the phenotype.

Combining multiple error independent classifiers into a meta-classifier improves prediction accuracy over individual classifiers. Using "pattern data" representation of the raw data is also an approach shown to boost the accuracy and the robustness of classifiers.

To create training and test data sets, the input data is 2/1 stratified sampled into a training and a test set. The test set is used for the validation of the meta-classifier. Prostate cancer patients are referred to as positive cases, and non-cancer patients as negative cases.

To normalize the data, the range of each m/z value is reduced by replacing the intensity x corresponding to each case with (x−min(x))/(max(x)−min(x)), where min(x) and max(x) are the minimum and maximum intensity respectively, of the m/z value across the samples in the training set. This transformation is also applied to the intensities in the test data, using the min/max values from the training data.

To reduce the noise produced by the Ciphergen system, the normalized data is smoothed with a Gaussian kernel. For each x=m/z value, x is replaced with a weighted average of the form $\Sigma_t N(t;x,\sigma)$ where the summation is over all the m/z values, with t the amplitude of the m/z value, and $N(t;x,\sigma)$ a Gaussian kernel with mean x and variance $\sigma^2$. To smooth out the 0.1% Ciphergen reading error around x, a sample of 11 m/z measurement values, 5 on each side around x, is used. Similar smoothing procedures may be applied for the analysis of mass spectrometry data.

The experimental noise at each m/z in the training data is estimated to be normally distributed with mean 0 and variance equal to the median of variances of intensities across all training samples. This estimation is based on the assumption that a majority of m/z values are not differentially identified across the cancer and non-cancer patients.

There are several potential sources of noise in the m/z data. One source is the normal variation of signal at each m/z value in a single patient or across patients in the population. Another is experimental noise, due to chemical or electronic processes, handling irregularities, time dependence of protein signal in serum, etc. The amount of noise from each of these factors can be estimated by careful experiment with replicate or multiple time sampling on the same patient and/or on the same sample.

The robust feature selection criteria of the present method 100, selects the m/z values which are significantly above the noise that is estimated as the variation of m/z value across patients for each m/z. In addition, the use of pattern space, which is described below, has the further effect of creating discrete variables, which are less sensitive to noise. Thus, although the method 100 may filter out subtle signals which are below the noise, the signals picked up are robust against measured noise.

As discussed above, robust feature selection (step 130) includes peak extraction, filtering and support set selection. A peak is defined as an m/z value whose intensity is higher than that at ±s nearby values around it for an individual spectrum in the raw data, and also higher than the estimated average background (i.e. the average intensity at ±s sites obtained after smoothing). Although valuable information might exist in any part of the spectrum, because of the high measurement variation in SELDI-TOF data, peaks are the most suitable biomarkers. Peaks are extracted from each individual spectrum using a window width s=100.

During filtering, a pool of peaks is retained that discriminate between cancer and non-cancer cases in the training data. The selection of a peak in the filtered set is based on estimating the false discovery rate (FDR) through the q-values. The filtering step includes using several tests aimed at finding the m/z values where the average or the variance of the intensities in different phenotypes are significantly different. The following tests may be applied.

The t-test may be used, which uses the t-statistics $t=(\mu_1-\mu_2)/(\sigma_1^2/n_1+\sigma_2^2/n_2)^{1/2}$ to determine if the means $\mu_1$ and $\mu_2$ of the intensity levels of an m/z value across the samples in the two different profiles are different; $\sigma_1$ and $\sigma_2$ are the corresponding standard deviation of the intensity levels, and $n_1$, $n_2$ are the number of samples in the two profiles.

The signal-to-noise ratio, which is a variant of the t-statistic, defined as $s2n=(\mu_1-\mu_2)/(\sigma_1+\sigma_2)$, may also be applied.

The Pearson correlation coefficient, which is the correlation between the intensity levels of an m/z value across the samples and the phenotype vector of the samples, may also be used.

The F-test, may also be used and is based on the ratio of the average square deviations from the mean between the two phenotypes (F statistics), and determines if the standard deviations of the intensity levels of an m/z value across the samples are different in the two phenotypes. Each of these tests assigned a p-value to each peptide, which are determined by permutation.

Finally, a technique for finding significant features is applied called Significance Analysis of Microarrays (SAM). SAM computes an adjusted t-statistic $d_i$ for each feature (peak) measuring the strength of the relationship between the peak's intensity and the response variable. It uses repeated permutations of the data to determine if the expression of any features are significantly related to the response. The cutoff for significance is determined by a tuning parameter delta, based on the false positive rate.

Each of the tests is applied to the smoothed training data and to 100 perturbations of the training data with experimental noise. The peaks retained are those with an FDR level <0.05 for each of the tests applied in each of the datasets.

Once accepted, the peaks were subjected to a further analysis as follows. A matrix of correlation between the selected peaks to identify the features that are highly correlated is calculated. A high degree of correlation means that these features are not independent and should not all be used in the classification. Many situations where features close in m/z values are highly correlated. For such features a binning procedure is defined, replacing the close range m/z features with the "average" m/z value if their correlation coefficient was >0.85. The binning procedure overcomes the fact noticed above that the same ion peak might be spread out across a wide range of data points. Additionally, instances where the correlation coefficient between peptides was >0.85 are found, but the peptides have very distinct m/z values.

The support set selection begins by selecting a "support set" of bins on which an accurate weighting voting pattern-based model can be constructed. A combinatorial pattern recognition algorithm is used to extract a large collection of high quality patterns from the training data and from perturbations with experimental noise of the training data. In a dataset consisting of a positive and a negative class, a pattern is defined by a subset of bounding conditions imposed on the values of a small number of features (e.g., m/z values), which are satisfied simultaneously by sufficiently many cases in one class and by relatively few cases in the opposite class.

In general, high quality positive patterns have low degrees, high positive (and low negative) prevalences and homogeneities. Similar conditions define high quality negative patterns.

Patterns are synthetic variables assigned to the patient set. Each pattern P can be thought of as a Boolean vector (with only 0-1 entries) across the samples. The value 1 is assigned if the sample satisfies the defining conditions of P, and 0 if it does not. These synthetic variables provide additional structural information about the data and can be used in combination with various machine learning techniques for classification or for class discovery.

The pattern setting parameters (e.g., prevalence, homogeneity, degree) are determined through a calibration process performed on 10-fold validation experiments on the training set. The 10-fold validation consists of splitting the training set in a stratified way into 10 equal-size subsets. Each of the 10 subsets is selected as a "test set" one at a time. The pattern recognition algorithm is trained on the remaining nine subsets and validated on the selected "test set". The quality of the setting pattern parameters is quantified through the overall accuracy of the algorithm on the 10 experiments and three types of pattern data, comprehensible, medium and comprehensive, are created. The collection of positive/negative patterns used in the comprehensible, medium and comprehensive data is obtained by selecting from the positive/negative pandect the minimal set of high quality patterns such that each case in the training data is covered by at least one, three and ten positive/negative patterns respectively.

During the multiple classifier construction (step 140), predictions are generated for the test data by training a number of different machine learning tools (e.g., classifiers) on the training data.

The artificial neural network (ANN) includes a set of source nodes forming an input layer, one or more hidden layers, and a single output layer node where the phenotype is determined. The link weights are adjusted to predict the phenotype using the training data and the trained net is used to predict the phenotype in the test data. The technique uses one or two hidden layers, considers two different types of cost functions ($L^1$ and entropic) and trains for 2000 sequences of complete data presentations.

Support vector machines are learning machines that can perform binary classification and pattern recognition tasks. When the input data is linearly separable, it finds a linear separating hyperplane which is furthest from both classes. When the input data is not linearly separable, it will non-linearly map the n-dimensional input space into a high dimensional feature space, in which it is assumed that the input data is linearly separable.

The weighted voting on pattern data is applied on the assumption that pattern data might be linearly separable, even if the raw data is not. If $P_1, \ldots, P_q$ and $N_1, \ldots, N_r$ are positive and negative patterns with prevalences $p_1, \ldots, p_q$ and $n_1, \ldots, n_r$, then each positive pattern $P_i$ can be considered as a "weighted voter" for the positive class, with the weight $$w_i = p_i \Big/ \sum_k p_k.$$

Similarly, each negative pattern $N_j$ can be considered as a "weighted voter" for the negative class, with the weight $$u_j = n_j \Big/ \sum_k n_k.$$

To get a prediction on a test case, it is determined which patterns (positive and negative) it satisfies. Then we sum the weights for the positive patterns satisfied and subtract the weights of the negative patterns satisfied. If the result is positive, the phenotype is cancer. If the result is negative, the phenotype is non-cancer. If the result is zero, no decision is possible.

In the k-nearest neighbors (kNN) classifier, the training set is used to classify a new case x. In the training set, the k nearest neighbors of x with respect to some distance metric are located and the class of x is predicted by applying a majority voting rule to the chosen k neighbors.

In the classification and regression trees (CART), a decision tree is created by finding a root feature which best classifies samples by phenotype and then by iterating this process on each branch to find two new features which best split each branch by phenotype. The recursion is completed when splitting is either not possible, or a singular classification can be applied to each element of the derived subset. If the tree becomes too complex, the weak support nodes are pruned. CART provides a general framework which takes into account several criteria for producing decision trees, e.g., which property should be tested at a node, when should a node be declared a leaf, what pruning method to apply, how to handle missing variables, etc.

Logistic regression is a form of regression used when the dependent variable y, is binary. Logistic regression applies maximum likelihood estimation after transforming the dependent variable y into a logic variable using $y \rightarrow \ln[p/(1-p)]$, where p is the probability of y to be positive. First, the training dataset is used to compute the coefficients in the regression system: $\ln[p/(1-p)]=a_1x_1+a_2x_2+ \ldots +a_Nx_N+b$. Next, for any test case, p can be computed from this linear system and determine the phenotype by the proximity of this value to the two p values for the phenotypes.

Each of these classifiers is calibrated on the training dataset and on three pattern datasets (comprehensible, medium and comprehensive). The calibration process consists of selecting optimal parameters for settings and is achieved through three folding validation experiments performed on the training data.

During the meta-classification (step 190), the individual predictions of the classifiers are combined into a meta-classifier. Several combining techniques are available, such as majority voting, where each classifier has a vote (proportional to its success rate in the training set) and the majority determines the final prediction, stacking, in which a learning algorithm is used to combine the predictions of individual classifiers into the meta-classifier, and cascading, in which an iterative process of combining classifiers is used, such that, at each iteration the training data is extended with predictions obtained in the previous iterations.

The first step in deciding what combining procedure is appropriate is to check the error distribution dependencies of the individual classifiers on the training data. If the error distributions are independent, the simple majority voting scheme is sufficient. In general however, the individual classifiers will produce correlated errors. A practical solution then is to map the original set of learned models into a new set of models using Principal Components Analysis (PCA) (step 196). The new "intermediate" models are decompositions of the original predictions over independent (orthogonal) components. Only the more informative components (i.e., those corresponding to higher eigenvalues in the PCA decomposition) are retained and weighted in order (e.g., 194) to define the final meta-classifier (step 198) as a linear combination of the intermediate meta-classifiers.

Then, the meta-classifier is validated (step 199) to test if the accuracy of the meta-classifier depends on the particular choice of the training set. An important quality of a good meta-classifier is its stability to small changes in the prediction patterns of the learned models, which typically occur in noisy data environments. To test the stability of the meta-classifier, the training and the pattern data may be perturbed with experimental noise, reconstructed the meta-classifier and analyzed the changes occurring in its predictions on the test set.

Example

A subset of 215 cases (169 non-cancer and 46 cancer patients) was selected for training data; the remaining 107 cases (84 non-cancer and 23 cancer patients) defined the test data. It was found that each spectrum had an average of 6790 peaks (95% CI 6750-6820). The union of the peaks in the 215 spectra in the training set covered all the 15,154 m/z values in the data. Some of the peaks (e.g., m/z=1966, m/z=2729, m/z=4052) occurred in all the 215 samples in the training data, while about 2000 peaks occurred in less than 10% of the samples.

Next, 100 datasets were generated as perturbations of the training data with experimental noise normally distributed as N(0, 1.75). 1289 peaks had $p<0.05$ for each of the tests (two-tailed t-test, signal-to-noise (s2n), Pearson correlation, two-tailed F-test) in each of the perturbed datasets and the smoothed training dataset. q-values were computed by using the Q-Value library (http://www.Bioconductor.org) for the corresponding lists of p-values for each test and each of the 1289 peaks. In addition, q-values for the peaks were computed by applying SAM.

From this analysis, 512 peaks were found to be significant in q at 95% confidence level for each of the five tests. These 512 peaks were clustered into 39 "bins" based on the average correlation of the intensity across the samples (cut-off correlation value=85%) in the training set. The results are summarized in Table 1.

| Bin # | 95% CI | | Representative m/z | # m/z values included in bin | Average intensity Cancer cases | Non-cancer cases |
|---|---|---|---|---|---|---|
| 1 | 254.990 | 254.990 | 254.990 | 1 | 0.46 | 0.58 |
| 2 | 272.946 | 274.224 | 273.585 | 10 | 0.30 | 0.48 |
| 3 | 278.140 | 278.140 | 278.140 | 1 | 0.37 | 0.26 |
| 4 | 277.450 | 281.740 | 279.595 | 6 | 0.50 | 0.36 |
| 5 | 359.761 | 364.819 | 362.290 | 6 | 0.40 | 0.63 |
| 6 | 363.235 | 367.040 | 365.138 | 4 | 0.45 | 0.29 |
| 7 | 364.596 | 373.480 | 369.038 | 5 | 0.51 | 0.35 |
| 8 | 415.070 | 415.070 | 415.070 | 1 | 0.51 | 0.37 |
| 9 | 416.590 | 416.590 | 416.590 | 1 | 0.45 | 0.34 |
| 10 | 428.810 | 431.635 | 430.223 | 4 | 0.39 | 0.28 |
| 11 | 470.605 | 484.855 | 477.730 | 4 | 0.61 | 0.72 |
| 12 | 491.060 | 504.800 | 497.930 | 2 | 0.37 | 0.52 |
| 13 | 500.556 | 504.031 | 502.294 | 11 | 0.44 | 0.26 |
| 14 | 515.725 | 519.245 | 517.485 | 2 | 0.32 | 0.18 |
| 15 | 538.877 | 542.457 | 540.667 | 6 | 0.44 | 0.28 |
| 16 | 586.070 | 586.070 | 586.070 | 1 | 0.54 | 0.64 |
| 17* | 875.799 | 875.811 | 875.805 | 2 | 0.12 | 0.02 |
| 18 | 895.780 | 895.780 | 895.780 | 1 | 0.25 | 0.14 |
| 19* | 935.025 | 935.025 | 935.025 | 10 | 0.18 | 0.04 |
| 20 | 952.510 | 952.510 | 952.510 | 1 | 0.16 | 0.04 |
| 21 | 980.950 | 980.950 | 980.950 | 1 | 0.26 | 0.14 |
| 22* | 1106.310 | 1106.310 | 1106.310 | 1 | 0.18 | 0.06 |
| 23* | 2009.127 | 2010.538 | 2009.833 | 24 | 0.19 | 0.31 |
| 24 | 2052.057 | 2052.987 | 2052.522 | 25 | 0.17 | 0.30 |
| 25 | 3108.330 | 3108.330 | 3108.330 | 1 | 0.30 | 0.23 |
| 26* | 3370.392 | 3371.423 | 3370.908 | 29 | 0.22 | 0.09 |
| 27* | 3471.836 | 3472.552 | 3472.194 | 41 | 0.23 | 0.11 |
| 28 | 3504.961 | 3505.606 | 3505.283 | 3 | 0.24 | 0.13 |
| 29* | 4096.067 | 4098.015 | 4097.041 | 34 | 0.28 | 0.38 |
| 30 | 4117.572 | 4118.074 | 4117.823 | 20 | 0.29 | 0.38 |
| 31 | 4625.511 | 4629.172 | 4627.342 | 25 | 0.36 | 0.28 |
| 32 | 4853.500 | 4853.500 | 4853.500 | 1 | 0.41 | 0.31 |
| 33 | 5241.970 | 5241.970 | 5241.970 | 1 | 0.33 | 0.23 |
| 34* | 6713.381 | 6714.365 | 6713.873 | 63 | 0.26 | 0.12 |
| 35* | 6805.956 | 6806.306 | 6806.131 | 26 | 0.22 | 0.11 |
| 36* | 6951.030 | 6951.685 | 6951.358 | 44 | 0.25 | 0.13 |
| 37* | 7085.121 | 7085.540 | 7085.331 | 38 | 0.28 | 0.14 |
| 38 | 7119.308 | 7120.018 | 7119.663 | 32 | 0.15 | 0.08 |
| 39 | 9217.333 | 9220.654 | 9218.993 | 44 | 0.39 | 0.31 |

The bin lengths varied from 1 to 63, with an average of 14. Each bin was assigned a "representative" m/z value defined as the median of the m/z values in the bin. For each sample, the intensity level associated with a bin was defined as the maximum of the intensities of that sample across all the m/z values included in the bin.

Two collections of patterns, consisting of 3940 positive and of 3458 negative patterns of degree 3 and having prevalences above 25%, respectively, were extracted from the data of the 39 bins. Combinations of bins were scored according to the frequency of their participation in the definition of the patterns. A subset of 11 bins scored above average and were selected for the support set (marked with an asterisk in Table 1). The "representative" m/z values of the bins in the support set are the following: 875.805, 935.025, 1106.310, 2009.832, 3370.907, 3472.194, 4097.041, 6713.873, 6806.131, 6951.358, and 7085.330.

The proteomic spectra analyzed in this example were derived from a Ciphergen SELDI system employing sinapinic acid (SPA) as the matrix. Ions less then 2,500 m/z are dominated by matrix artifacts (matrix cluster ions). Hence, 24 of the 39 bins (bins 1 through 24 in Table 1) may have had questionable biological relevance.

A collection of 1208 positive patterns and 963 negative patterns of degree 3 with a prevalence of at least 25% were extracted from the training data restricted to the support set. The comprehensible, medium and the comprehensive pattern datasets (having sizes 10, 20 and 250) were obtained by imposing the constraint that each case in the training dataset be covered by at least 1, 3, and 10 patterns, respectively.

The individual classifiers ANN, SVM, k-NN (k=5), CART, and logistic regression were trained on the raw and pattern data and weighted voting classifiers were calibrated on the three pattern datasets. The performance of the individual meta-classifiers on the training data was assessed through "leave-one-out" experiments. The overall error distribution of the classifiers was uncorrelated, with only 2 false negative and 1 false positive errors for which the majority of the classifiers agreed. The individual classifiers performed best on the pattern data for comprehensive collections of patterns (of size 250). Also, with the exception of decision trees, the performance of the individual classifiers on pattern data was better than their performance on the raw data.

The meta-classifier was constructed as a linear combination of the individual classifiers. The overall sensitivity of the meta-classifier was 91.30%, and the overall specificity was 98.81%. The classifiers are uncorrelated because the accuracy of the meta-classifier is significantly better than that of the individual classifiers.

Figure 2B:
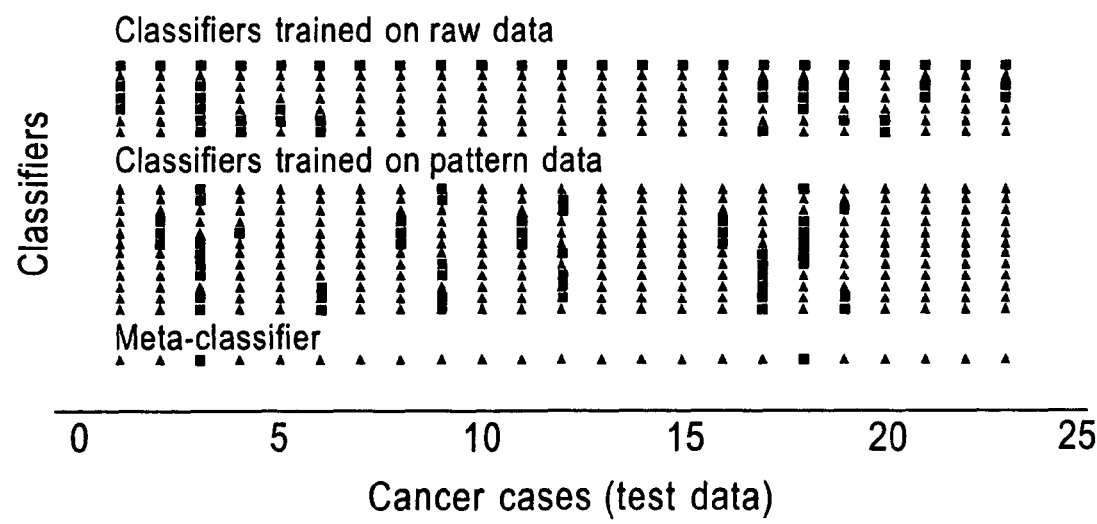
FIG. 2B illustrates predictions of the meta-classifier and of individual classifiers on cancer cases.
Figure 3A:
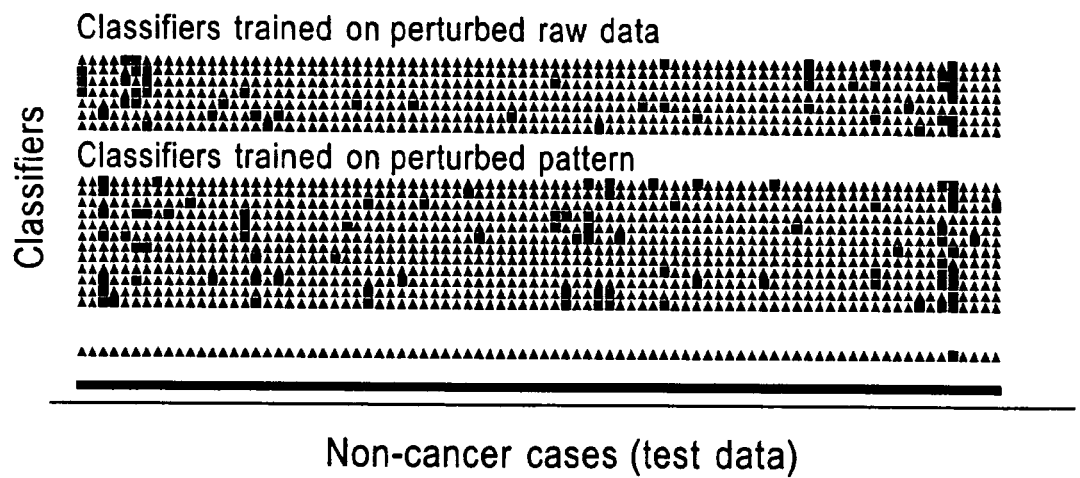
FIG. 3A illustrates predictions of the meta-classifier and of individual classifiers trained on perturbed data for non-cancer cases.
Figure 3B:
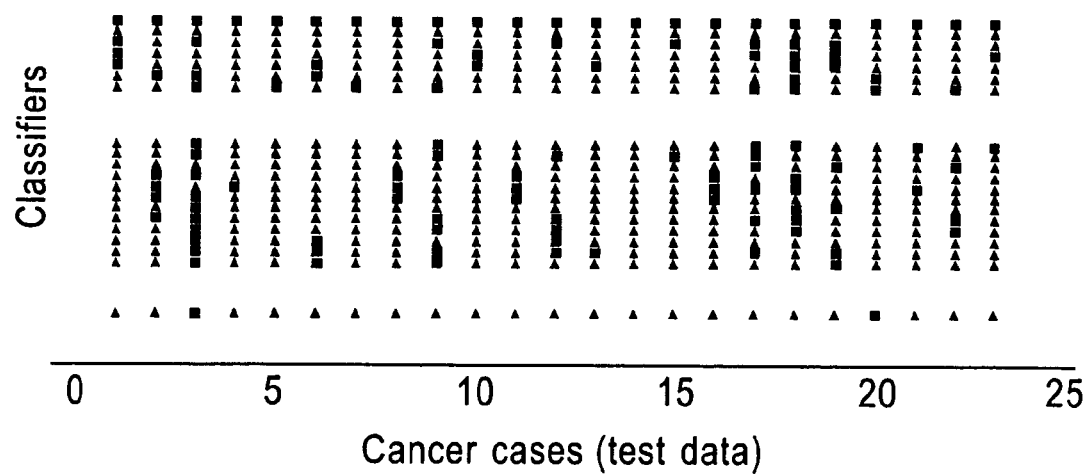
FIG. 3B illustrates predictions of the meta-classifier and of individual classifiers trained on perturbed data for cancer cases.

The predictions of the meta-classifier and the individual classifiers for the non-cancer and cancer cases in the test set are shown in FIGS. 2a and 2b respectively. The triangle shaped dots represent correct predictions and the squares represent false predictions. The improvement of the meta-classifier over the individual classifiers is clearly visible in FIGS. 2(a,b). The meta-classifier made only one false positive prediction for the 84 non-cancer cases and only two false negative predictions out of 23 cancer cases.

To assess the meta-classifier's stability to data variance, the training dataset was perturbed with experimental noise (Gaussian N(0, 1.75)), and generated the corresponding pattern datasets. The individual classifiers were retrained on the perturbed data and then reconstructed the corresponding meta-classifier. Only a very small variation in the predictions of the individual classifiers is shown (see FIGS. 3a and 3b). More significantly, the meta-classifier predictions did not change at all. This means that the meta-classifier is extremely stable to statistical noise. This effect is what one would have expected from the stringent noise stability conditions imposed on the meta-classifier and is a validation of the present inventive method 100.

It should be evident, after considering the description above, that the method 100 could apply to other types of cancers as well, and can be generalized for multi-phenotype prediction.

Figure 4:
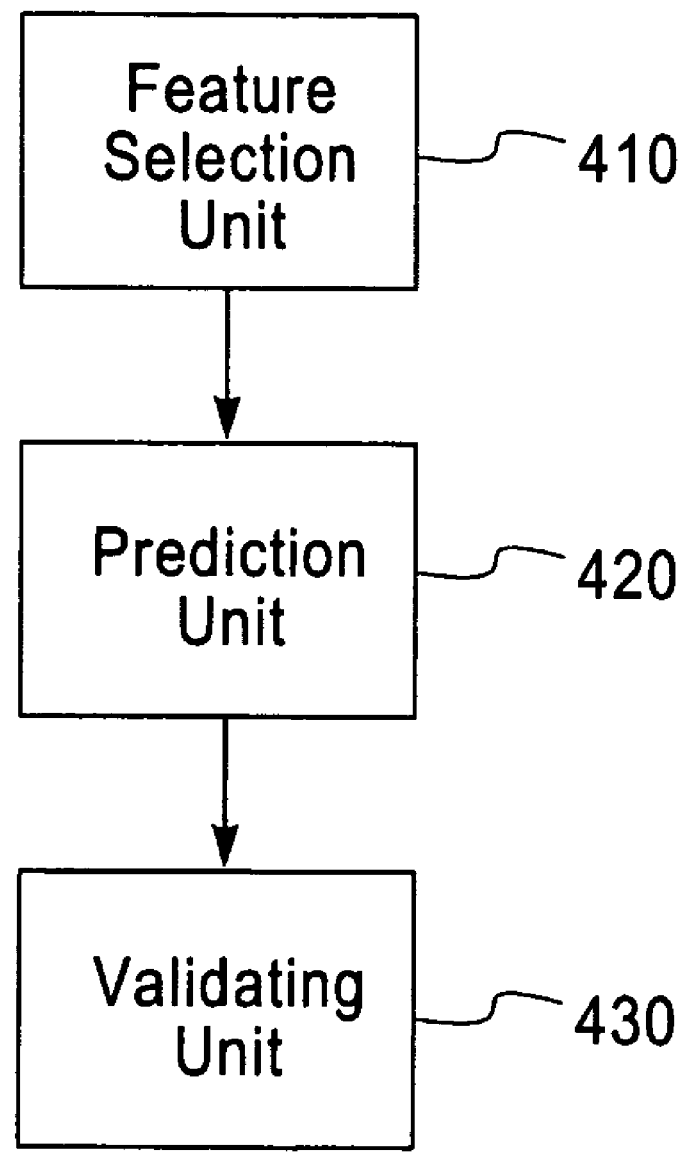
FIG. 4 illustrates a classification system 400 in accordance with the claimed invention.

FIG. 4 illustrates an exemplary block diagram of a classification system 400 for a computer implementation of the present invention. This system would include a feature selection unit 410 that conducts robust feature selection of a set of data, a prediction unit 420 that generates predictions for the set of data and a validating unit 430 that validates the predictions. Other exemplary embodiments of the classification system may include a data inputting section and a preprocessing section.

FIG. 5 illustrates a typical hardware configuration of an information handling/computer system in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A computer-implemented classification method, comprising programming a computer to perform:
   preprocessing mass spectrometry data, said preprocessing comprising creating a training data set and test data sets,
   conducting robust feature selection from the mass spectrometry data, said robust feature selection comprising:
      peak extraction to identify peaks in a data spectrum and to extract peaks from background data in the data spectrum;
      filtering data peaks extracted by said peak extraction; and
      selecting a support set of data on which an accurate weighting pattern-based model can be constructed by using a combinatorial pattern recognition algorithm to extract a large collection of data patterns from the set of data and from perturbations with experimental noise of the set of data;
   generating predictions for the test data, comprising mass spectrometry data, sets using multiple data classifiers, said multiple data classifiers comprising artificial neural networks, support vector machines, weighted voting on data patterns, classification and regression tress, k-nearest neighbor classification, and logistic regression;
   constructing and validating a meta-classifier by combining and averaging individual predictions of said multiple data classifiers to generate a robust prediction of a phenotype:
      mapping said individual classifiers to generate intermediate classifiers; and
      linearly combining said intermediate classifiers to generate a meta-classifier,
      wherein said test data sets are used exclusively for validation of the meta-classifier.

2. A computer-implemented classification method, comprising programming a computer to:
   receive data;
   conduct robust feature selection from the data;
   generate predictions for the data using multiple data classifiers; and
   construct and validate a meta-classifier by combining and averaging individual predictions of the multiple data classifiers to generate a robust prediction.

3. The computer-implemented classification method according to claim 2, further comprising creating at least one set of training data and at least one set of test data, prior to the robust feature selection.

4. The computer-implemented classification method according to claim 2, further comprising preprocessing the data, the preprocessing comprising data normalization, data smoothing, and noise elimination.

5. The computer-implemented classification method according to claim 2, wherein the robust feature selection comprises peak extraction to identify peaks in a data spectrum and to extract peaks from background data in the data spectrum.

6. The computer-implemented classification method according to claim 5, wherein the robust feature selection further comprises filtering data peaks extracted by said peak extraction.

7. The computer-implemented classification method according to claim 5, wherein the robust feature selection further comprises selecting a support set of data on which an accurate weighting pattern-based model can be constructed by using a combinatorial pattern recognition algorithm to extract a large collection of data patterns from the set of data and from perturbations with experimental noise of the set of data.

8. The computer-implemented classification method according to claim 2, wherein the generating predictions comprises training pattern data and raw data using the multiple data classifiers.

9. The computer-implemented classification method according to claim 2, wherein the multiple data classifiers comprise artificial neural networks, support vector machines, weighted voting systems, decision trees, and logistic regression.

10. The computer-implemented classification method according to claim 2, wherein the individual predictions are combined using at least one of majority voting, stacking, and cascading.

11. A tangible computer-readable storage medium storing computer-readable instructions for performing a classification method, comprising:
    receiving data;
    conducting robust feature selection from the data;
    generating predictions for the data using multiple data classifiers; and
    constructing and validating a meta-classifier by combining and averaging individual predictions of the multiple data classifiers to generate a robust prediction.

12. The computer-readable storage medium according to claim 11, further comprising creating at least one set of training data and at least one set of test data, prior to the robust feature selection.

13. The computer-readable storage medium according to claim 11, further comprising preprocessing the data, the preprocessing comprising data normalization, data smoothing, and noise elimination.

14. The computer-readable storage medium according to claim 11, wherein the robust feature selection comprises peak extraction to identify peaks in a data spectrum and to extract peaks from background data in the data spectrum.

15. The computer-readable storage medium according to claim 14, wherein the robust feature selection further comprises filtering data peaks extracted by said peak extraction.

16. computer-readable storage medium according to claim 14, wherein the robust feature selection further comprises selecting a support set of data on which an accurate weighting pattern-based model can be constructed by using a combinatorial pattern recognition algorithm to extract a large collection of data patterns from the set of data and from perturbations with experimental noise of the set of data.

17. The computer-readable storage medium according to claim 11, wherein the generating predictions comprises training pattern data and raw data using the multiple data classifiers.

18. The computer-readable storage medium according to claim 11, wherein the multiple data classifiers comprise artificial neural networks, support vector machines, weighted voting systems, decision trees, and logistic regression.

19. The computer-readable storage medium according to claim 11, wherein the individual predictions are combined using at least one of majority voting, stacking, and cascading.

* * * * *